US006271386B1

(12) United States Patent
Shih et al.

(10) Patent No.: US 6,271,386 B1
(45) Date of Patent: Aug. 7, 2001

(54) PRODUCT AND PROCESS FOR MAKING QUATERNIZED, WATER SOLUBLE VINYLPYRIDINE CARBOXYLATE POLYMERS

(75) Inventors: Jenn S. Shih, Paramus; Eduardo T. Yap, Franklin Lakes; John C. Hornby, Washington Township; Bala Srinivas, Hasbrouck Heights, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/401,113

(22) Filed: Sep. 22, 1999

Related U.S. Application Data

(63) Continuation-in-part of application No. 09/211,734, filed on Dec. 15, 1998, now Pat. No. 6,156,829.

(51) Int. Cl.[7] .................. C07D 213/20; A01N 43/40; C11D 3/37; C08J 3/03
(52) U.S. Cl. .............. 546/347; 504/250; 504/116; 510/337; 510/361; 524/99; 524/457; 524/458; 525/191; 525/205; 525/218; 525/329.4; 525/333.3; 528/502 A; 528/503; 546/341; 546/340

(58) Field of Search .............. 524/99, 457, 458; 525/191, 205, 218, 329.4, 333.3; 526/72, 213, 258; 528/562 A, 503; 546/347, 341; 504/116, 250; 510/337, 361

(56) References Cited

U.S. PATENT DOCUMENTS 5,776,879 * 7/1998 Shih et al. ............... 510/361

* cited by examiner

*Primary Examiner*—Charanjit S. Aulakh
(74) *Attorney, Agent, or Firm*—Marilyn J. Maue; William J. Davis; Walter Katz

(57) ABSTRACT

This invention relates to stable, quaternized vinlypyridine carboxylate home-, co- and ter-polymers, useful as dye transfer inhibitors and polymers complexable with active agrochemical, pharmaceutical or cosmetic agents for controlled release thereof, and to a commercial process for the synthesis of said polymers in high yield and purity.

21 Claims, No Drawings

PRODUCT AND PROCESS FOR MAKING QUATERNIZED, WATER SOLUBLE VINYLPYRIDINE CARBOXYLATE POLYMERS

This application is a continuation-in-part of U.S. patent application, Ser. No. 09/211,734, filed Dec. 15, 1998, now U.S. Pat. No. 6,156,829, issued Dec. 5, 2000 by the same inventors, entitled PRODUCT AND PROCESS FOR MAKING QUATERNIZED, WATER SOLUBLE VINYLPYRIDINE CARBOXYLATE POLYMERS.

BACKGROUND OF THE INVENTION

1. Field of the Invention

This invention relates to novel quaternized, dye-complexable vinlpyridine carboxylate polymers, and to the process for their preparation involving water based, suspension polymerization of 4-vinyl pyridine monomer and subsequent quaternization of the resulting vinyl pyridine polymer.

2. Description of the Prior Art

Dye complexing polymers have been used in laundry detergent and fabric softener compositons to stabilize and minimize leaching of dyes in colored fabrics. During washing of colored and white fabrics, some of the dyes can bleed out of a colored fabric and a portion of the leached dye may deposit on white or lighter colored fabrics. The degree of bleeding is influenced by the character of the dye, the type of cloth and the pH, temperature and mechanical efficiency of the agitation process. Although is some cased the bled dye in the wash liquor can be washed off without altering the color of lighter colored fabrics, the dyed fabric looses a degree of brilliance resulting in a somewhat faded appearance. Often it is found that the fugitive dye deposits either onto the same fabric or onto another fabric leading to patches and streaks in the washed material. This deposition of the bled dye can be inhibited in several ways. One method involves the use of a dye transfer inhibitor (DTI) compound which can complex with the dye and minimize leaching or at least prevent redeposition on the same or other fabrics.

Polyvinylprrolidone (PVP), by virtue of its dye complexation ability, has been used to inhibit dye deposition during washing of colored fabrics under laundry conditions. The performance of PVP as a DTI, however, is adversely affected by the presence of anionic surfactants usually present in the washing process.

Vinylpyridine polymers such as those disclosed in U.S. Pat. No. 4,824,910 and in our previous U.S. patent application, Ser. No. 932,448, now U.S. Pat. No. 5,776,879, were formerly synthesized in alcoholic media; however, the product of this process contains significantly high unreacted monomer for a given period of reaction time and requires separation of organic solvent to recover pure polymer product. Costly and time consuming treatments are employed to remove impurities with the organic solvent in order to recover a purified product having no objectionable color.

Accordingly, it is an object of this invention to provide quaternized, complexable vinyl pyridine carboxylate polymers and an improved process for the preparation of the non-quaternized polymers, subsequent to their quaternization, which polymers are soluble in water.

Another object is to provide an economical and commercial process for the preparation of a water soluble dye transfer inhibitor and polymers for agrochemical or pharmaceutical formulations which have superior complexing properties and which are obtained in high purity suitable for immediate use.

A further feature of the invention is the provision of a water soluble poly (vinylpyridine polymer) containing a quaternary nitrogen and a carboxylate salt in high yield and purity.

Another object of the invention is to provide a laundry detergent composition which effectively resists fabric dye transfer during the washing and rinsing cycles, even in the presence of anionic surfactants. These and many other benefits and advantages of this invention will become apparent from the following description and disclosure.

SUMMARY OF THE INVENTION

This invention is directed to an a quaternized water soluble vinyl pyridine carboxylate polymer and to an economic and commercially desirable process for synthesizing the water soluble, quaternized vinylpridine carboxylate polymer product in high yield and purity which product possesses superior complexing properties and is stable in aqueous and water media. The quaternized polymeric product of this invention, which can be obtained in water solution or in powder form, contains (a) from 30 to 100 wt. % of a quaternized monomer having 20 to 5,000 quaternized units, preferably 100 to 2,500 units, of the structure

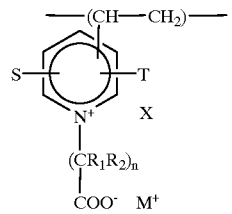

(b) 0 to 30 wt. of a non-quaternized vinylpyridine unit having the structure

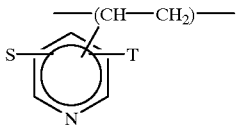

and (c) 0 to 70 wt. % of an unsaturated polymerizable comonomer wherein X is an anion; M is a cation, preferably an alkali or alkaline earth metal, most preferably sodium or potassium; at least one of $R_1$ and $R_2$ in the expression $(CR_1R_2)_n$ is a radical having a —C—O— containing moiety, which radical is selected from the group consisting of alkoxy, carboxyl, an alkali or alkaline earth metal salt of a carboxylic acid and a $C_2$ to $C_{13}$ carboxylate optionally substituted with halogen and any remaining $R_1$ and $R_2$ in the expression $(CR_1R_2)_n$ is selected from the group consisting of hydrogen, lower alkyl and aryl; S and T are each independently hydrogen or $C_1$ to $C_4$ alkyl; and n has a value of from 1 to 5. The copolymer containing 70–95% (a) and 5–30% (c), with at least 0.5 wt. % of (b), is an exceptionally good complexing agent for many pharmaceuticals, personal care components and agrochemicals requiring film forming properties.

The above quaternized unit is polyfunctional and is chacterized as having a —C—O— containing group between the quaternized nitrogen and the terminal carboxylate salt moiety. The intervening carbonoxy group (—C—O—) provides an additional reactive site for stronger bonding to an active dye, pharmaceutical, agrochemical or hair and skin treating agent and therefore provides a polymer having significantly increased complexability for use in a wide variety of applications. Particularly its dye complexing property provides excellent dye transfer inhibition in printing, laundry and rinse formulations for the cleansing or dying of fabrics.

The comonomers of the above polymers are free radical polymerizable comonomers including styrene, alkyl styrene, N-vinylpyrrolidone, N-vinyl caprolactam, vinyl imidazole, N-vinyl amide, a lower alkyl acrylate, a lower alkyl methacrylate, acrylamide, methacrylamide and the like and mixtures thereof.

The preferred product of the invention are polymers where, in monomer moiety (a), n has a value of 1 to 3, X is a halide, particularly chloride or bromide, M is a metal such as sodium, potassium or calcium and at least one of said $R_1$ and $R_2$ is —COOY; wherein Y is hydrogen, an alkali or alkaline earth metal or $C_1$ to $C_4$ alkyl; S and T are both hydrogen and the polymer is 75–100% quaternized.

The polymer products of the present invention have a weight average molecular weight of from about 5,000 to about 1,000,000, preferably from 20,000 to 500,000.

The present polymers are most preferably those containing from 100 to 2,000 monomer units; which homo-, co- or ter-polymers are particularly useful at a concentration of from about 2 to about 1,000 ppm in laundry detergent or rinse, a drug, cosmetic or agrichemical formulations, ink and paint compositions etc. to inhibit the migration of dye or to complex with an active chemical for controlled release of the active component.

In general, the vinyl pyridine polymer reactant of the present invention, containing 0 to 70 wt. % comonomer(s), can be obtained by several types of polymerization, i.e.solution, suspenison, emulsion and precipitation polymerization processes in which a suitable solvent such as a $C_1$ to $C_4$ alkanol, water or a mixture thereof is employed as un U.S. Pat. Nos. 5,627,151 . and 5,458,809; EP 0664332 A and J. of Polymer Science 26/No.113/pp25–254/1957, incorporated herein by reference. Surprisingly it is now discovered that the vinyl pyridine polymer prepared by suspension polymerization has advantages over other types of polymerization. However, the polymerized products can be obtained as an emulsion, suspension, dispersion or as dry particles or powder. As feed to the quaternization zone of the present process, the vinylpyridine polymer is employed as a water mixture containing from about 20 to about 50 wt. % solids. The quaternization is effected under constant agitation at a temperature of between 40° and about 140° C., optionally under a blanket of inert gas and in the presence of an aqueous solution of a selected quaternizing agent until the desired degree of quaternization is achieved. In a preferred embodiment, the quaternized polymer products of the present invention are derived from a water based suspension polymerization of vinyl pyridine with or without comonomer and subsequently quaternized. The water suspension containing the polymer is treated as an intermediate product when using the preferred polymerization process and the intermediate is then subjected to quaternization with selected quaternizing agents containing said carbonoxy moiety to produce the quaternized products of the present invention in high yield and purity.

More specifically, in the preferred process, the polymerization of the vinyl pyridine, in the presence or absence of comonomer, is effected in water, initiator and suspension agent at a temperature of between about 60° and about 115° C. The polymerization reaction is described by the equation:

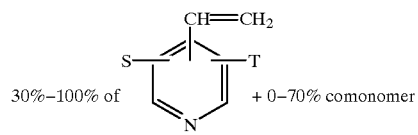

coplymer of

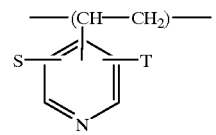

comonomer or vinylpyridene homopolymer. Suitable free radical polymerization initiators, include a peroxide, perester, percarbonate, redox initiator or a diazo compound.

In the above process, the molecular weight of the non-quaternized polymer can be varied according to preference by several methods. For example, lower molecular weights are obtained at the higher temperatures within the above range, a higher concentration of initiator generally results in lower molecular weight product and the incorporation of a small amount, e.g. 0.5 to 20 wt. %, preferably 0.5 to 10 wt. %, of chain transfer agent, such as an alkyl thiol, isopropyl alcohol and the like, also provides lower molecular weight polymer.

The water soluble suspension agent of this invention is employed at a concentration of from about 0.75 to about 20 wt. %, preferably from about 1 to about 10 wt. %. Suitable suspension agents for the reaction mixture include a poly vinyl lactam, particularly polyvinyl-pyrrolidone having a K value of 12 to 120, hydroxyethyl cellulose, a polyvinyl alcohol, carboxymethyl cellulose and other inert water soluble types and mixtures thereof. Of these, polyvinyl pyrrolidone is preferred. Although not required, if desired, the suspension agent can also be added with an appropriate emulsifier, hereinafter described.

Initially, in accordance with the preferred process, the vinyl pyridine monomer, in the presence or absence of comonomer, is mixed with the suspension agent and water at ambient temperature under constant agitation and a blanket of inert gas. The resulting mixture is then heated to reaction temperature while the free radical initiator is added continuously or in increments during a 1 to 8 hour reaction period or until the desired concentration of monomer is achieved, desirably a monomer concentration below 1 wt. %. The resulting non-quaternized intermediate polymer product, suspended in water, is recovered in particulate form as a stable suspension for subsequent or direct feed to the quaternization zone.

The water emulsion containing from about 20 to about 50% solids of non-quaternized vinyl pyridine polymer intermediate is contacted with a water soluble alkali or alkaline earth metal salt of a halogenated $C_1$ to $C_{12}$ carbonoxy substituted mono- or poly-carboxylic acid at a temperature of between about 70° and about 100° C. under vigorous agitation until the quaternization occurs. The concentration of quaternizing agent employed depends on the number of quaternizable nitrogen sites in the polymer and the degree of quaternization desired. Generally, between about 0.5 and about 1.5 moles of quaternizing agent per nitrogen atom in the polymer is utilized. The resulting polymer product, having quaternized nitrogen and carboxylate metal salt moieties, is suitable for incorporation into a detergent, dye or other formulation without further purification.

Specific halogenated metal carboxylate agents suitable for quaternization of the vinyl pyridine polymer may be saturated or unsaturated and include for example a sodium, potassium or calcium salt of a halo —C—O— modified carboxylic acid such as 3-chloro- or 3-bromo-1-methoxypropionic acid; 4-chloro- or 4-bromo-ethoxy containing butyric acid and haloglutaric, haloadipic, halopimelic, halosuccinic, halosuberic, halopimetic, halosebacic, haloitaconic, halo oxyethyl lauric, halo oxyethyl succinic, halo maleic, halo malonic, acids and other chlorinated or brominated metal salts of carbonoxy modified carboxylic acids including —CO— modified glutaric, adipic, pimelic, succinic, suberic, sebacic, itaconic, lauric, maleic, melonic, acrylic, propionic, and acetic acids. Some specific examples of these are the sodium or potassium salts of 4-chloroethyl acrylate butyric acid, 2-bromoacrylate propionic acid, 2-chloro-2-ethoxy propionic acid, 2-chloromaleic acid, chloroglutaric acid, bromoadipic acid, chloro sebacic acid and the like and mixtures thereof.

The quarternizing agents are employed alone or in admixture with the corresponding alkali or alkaline earth metal salts of halogenated, non-carbonoxy-modified acid wherein $R_1$ and $R_2$ in the expression $(CR_1 R_2)_n$ are each individually hydrogen, lower alkyl or aryl.

As an alternative to the above synthesis process, the vinyl pyridine can be quaternized before polymerization to produce the quaternized monomer having the structure:

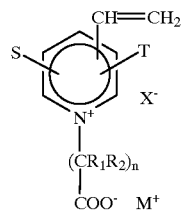

wherein X is halogen, most preferably chlorine, and M is most preferably sodium or potassium.

Polymerization of the quaternized monomer with initiator and suspension agent is effected as described above. In this operation, the quaternized vinylpyridine monomer feed to the polymerization zone can contain an amount, less than 70 wt. %, of the aforementioned comonomer for certain applications required by the consumer. In this case the resulting copolymer is also recoverable in a high state of purity and small particle size is the quaternized homopolymer.

Specific examples of free radical polymerization initiators employed in the process include t-butyl peroxy pivalate (LUPERSOL 11); t-amylperoxy pivalate (LUPERSOL 554); t-amyl-(2-ethylhexyl)peroxy carbonate (LUPERSOL TAEC); 1,1-di-(t-amylperoxy)cyclohexane (LUPERSOL 531); azo bis(2-methylbutyronitrile (VAZO 67); azo bis (isovaleronitrile (VAZO 52); azo bis(cyclohexane carbonitrile (VAZO 88) and the like and mixtures of the same. Low temperature initiators include the diacyl peroxides, diesters and azo compounds. High temperature initiators, which may be employed in the final stages of polymerization include 2,5-dimethyl-2,5-di-(t-butyl-peroxy)hexane (LUPERSOL 101); ethyl-2,5-di-(t-butyl-peroxy) hexane; dicumyl peroxide; t-butylcumyl peroxide; t-butylperoxy maleic acid; ethyl-3,3-di(t-butylperoxy) butyrate; di-t-butyl-diperoxy phthalate and the like.

If desired the polymerization reaction mixture can also contain up to about 10 wt. % of an emulsifier surfactant based on total monomer, including cationic, non-ionic, anionic, amphoteric and zwitterionic emusifiers, such as one or a mixture of those disclosed at column 8–16 of U.S. Pat. No. 5,458,809; incorporated herein by reference. Specific examples of these water soluble emulsifiers include an alkali metal sulfonate such as sodium or potassium dodecylbenzene sulfonate (LAS); coconut trimethyl ammonium chloride or bromide, N-coco-3-aminopropionic acid, triethanol oleate, sodium or potassium oleate, N-cetyl-N-ethyl morpholinium ethosulfate, sodium or potassium lauryl sulfate, lauryl alcohol polyether, polyethoxylated sorbitan monolaurate (TWEEN 20) and the like or a mixture thereof in the presence or absence of a suspension agent.

Having generally described the invention, reference is now had to the following examples which illustrate preferred embodiments but which are not to be construed as limiting to the scope of the invention as set forth in the appended claims.

EXAMPLE 1

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinyl-pyrrolidone) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxypivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained. Poly(4-vinylpyridine) of molecular weight about 100,000 was recovered as a water suspension of 95 wt. % microparticles of substantially pure poly(4-vinylpyridine). The polymer was dried overnight in an oven and 30 grams of the dried polymer was then contacted with 94.5 grams of water and 33.0 grams of sodium 2-chloro-succinate. The reaction mixture was held at 85° C. for 2 hours under constant agitation and then recovered as the quaternized product of the process having repeating units of

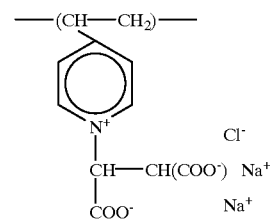

EXAMPLE 2

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of polyvinyl alcohol (98% hydrolysis, MW=10,000–30,000) and 240 g. of water was charged. The nitrogen purge was begun and continued throughout the experiment. The above mixture at ambient temperature was then gradually heated and held at 85° C. for 30 minutes while operating the blade agitator at 350 rpm. An initial charge of 1.0 g. of t-butyl peroxy-pivalate (Lupersol 11) was added to the mixture and agitation was continued for one hour; after which 0.5 g. of Lupersol 101 was added and the temperature in the kettle was raised to 110° C. the reaction continued under agitation for an additional 8 hours until only a trace of unconverted monomer remained.

The above water suspension was then converted to 40% solids solution by adding 66.4 g. of sodium 2-chloro-2-ethoxy butyrate into the kettle. The reaction mixture was held at 85° C. for 2 hours under constant agitation until 90% of the vinyl pyridine polymer was quaternized and then recovered as the quaternized product of the process having repeating units of

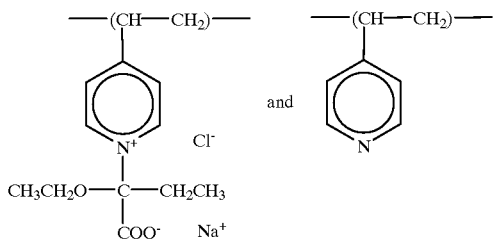

EXAMPLE 3

Into a one liter four-neck resin kettle, fitted with a half-moon teflon blade agitator, a nitrogen purge adapter and a reflux condenser, a mixture of 60 g. of 4-vinlpyridine, 0.3 g. of polyvinyl alcohol (MW 10,000–30,000) and 240 g. of water was charged. The nitrogen purge was begun and continued throughout the experiment. The resulting mixture was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in the kettle was raised to 80° C. after which 0.2 g. of t-butyl peroxypivalate was added every hour until only a trace of unconverted 4-vinyl pyridine monomer remained. Poly(4-vinyl pyridine) of about 200,000 molecular weight was recovered as a wet cake of substantially pure poly(4-vinyl pyridine). The polymer was then dried overnight in an oven and 30 g. of the dried polymer was redispersed in 100 g. of water. To this dispersion was added a solution of 48.0 g. of sodium 2-chlcormethyl succinate in 50 g. of water. This mixture was held at 85° C. for 6 hours under constant agitation and then recovered as the quaternized product of the process having repeating units of

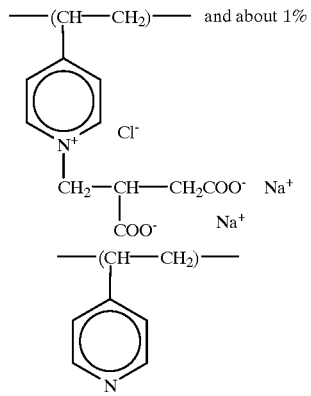

EXAMPLE 4

Into a one liter four-neck resin kettle, fitted with a half-moon teflon blade agitator, a nitrogen purge adapter and a reflux condenser, a mixture of 50 g. of 4-vinyl pyridine monomer, 10.0 g. of N-vinyl pyrrolidone and 240 g. of water was charged. The nitrogen purge was begun and continued throughout the experiment. The above mixture at ambient temperature was then gradually heated and held at 65° C. for 30 minutes while operating the blade agitator at 350 rpm. An initial charge of 1.0 g. of t-butyl peroxpivalate (Lupersol 11) was added to the mixture and agitation was continued for one hour. The temperature in the kettle was raised to 80° C.; after which 0.2 g. of t-butyl peroxypivalate was added every hour until only a trace of unconverted 4-vinyl pyridine monomer remained. Poly(4-vinyl pyridine/N-vinyl pyrrolidone) of molecular weight about 150,000 was recovered as a wet cake of substantially pure poly(4-vinyl pyridine/N-vinyl pyrrolidone). The polymer was dried overnight in an oven.

30 g. of the dried polymer was then redispersed in 100 g. water and then the solution of 44.0 g. of sodium 2-chloro-3-penten-1,5-dioate and 50 g. of water were charged. The mixture was held at 85° C. for 10 hours under constant agitation and then recovered as the quaternized product of the process.

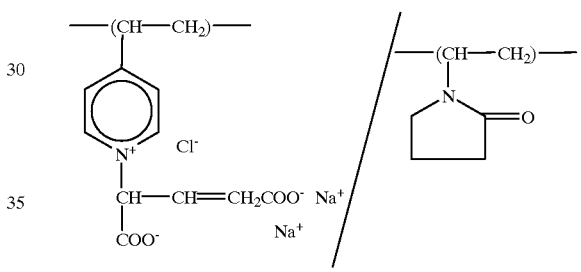

EXAMPLE 5

Into a one liter four-neck resin kettle fitted with a half-moon teflon blade agitator, a nitrogen purge adapter and a reflux condenser, a mixture of 60 g. of 4-vinyl pyridine, 65 g. of N-vinyl pyrrolidone and 240 g. of water was charged. The nitrogen purge was started and continued throughout the experiment. The resulting mixture was gradually heated and held at 65° C. for 30 minutes while operating the blade agitator at 350 rpm. An initial charge of 1.0 g. of t-butyl peroxypivalate was added to the mixture and agitation was continued for one hour. The temperature in the kettle was then raised to 80° C. after which 0.2 g. of t-butyl peroxypivalate was added every hour until only a trace of monomer remained. The copolymer, having a molecular weight of about 300,000, was recovered as a wet cake. The copolymer was then dried and 30 g. of the dried product was redispersed in 100 g. of water after which 56 g. of sodium 2-chloro succinate in 50 g. of water was added. This mixture was held at 85° C. for 6 hours under constant agitation and the resulting quaternized poly(vinyl pyridine/vinyl pyrrolidone) copolymer was recovered as the product of the process having repeating units of

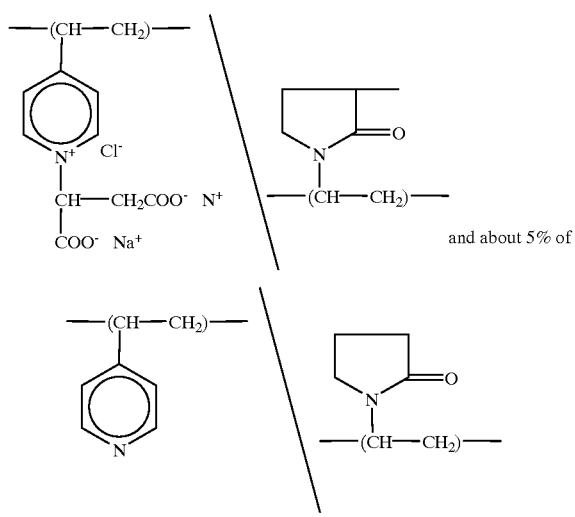

and about 5% of

EXAMPLE 6

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinyl-pyrrolidone) and 240 g. of water was charged. The nitrogen purge was begun and continued throughout the experiment. The above mixture at ambient temperature was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in th kettle was raised to 80° C. after which 0.2 g. of Lupersol 11 was added every hour until only a trace of unconverted monomer remained. Poly(4-vinylpyridine) of molecular weight about 200,000 was recovered as a wet cake of substantially pure poly(4-vinylpyridine). The polymer was dried overnight in an oven and 30 grams of the dried polymer dispersed in 100 g. of water and then a solution of 50 g. of monosodium 2-chloro-2-methyl malonate and 50 g. of water were charged. The reaction mixture was held at 85° C. for 6 hours under constant agitation and then recovered as the quaternized product of the process having repeating units of

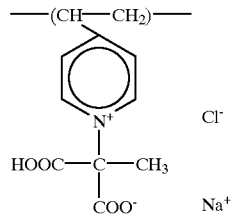

EXAMPLE 7

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinyl-pyrrolidone) and 240 g. of water was charged. The nitrogen purge was begun and continued throughout the experiment. The above mixture at ambient temperature was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in the kettle was raised to 80° C. after which 0.2 g. of Lupersol 11 was added every hour until only a trace of unconverted monomer remained. Poly(4-vinlypyridine) of molecular weight about 200,000 was recovered as a wet cake of substantially pure poly(4-vinylpyridine). The polymer was dried overnight in an oven and 30 grams of the dried polymer dispersed in 100 g. of water and then a solution of 50 g. of monosodium methyl 2-chloro-2-methyl-malonate and 50 g. of water were charged. The reaction mixture was held at 85° C. for 6 hours under constant agitation and then recovered as the quaternized product of the process having repeating units of

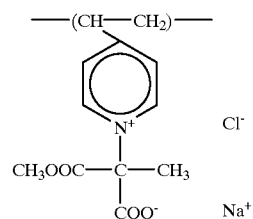

EXAMPLE 8

Into a one liter four-neck resin kettle, fitted with a half-moon Teflon blade agitator, a nitrogen purge adapter and a reflux condenser, a mixture of 60 g. of 4-vinyl pyridine monomer, 3.0 g. of K-30 poly(vinyl-pyrrolidone) and 240 g. of water was charged. The nitrogen purge was begun and continued throughout the experiment. The above mixture at ambient temperature was then gradually heated and held at 65° C. for 30 minutes while operating the blade agitator at 350 rpm. An initial charge of 1.0 g. of t-butyl peroxypivalate (Lupersol 11) was added to the mixture and agitation was continued for one hour. The temperature in the kettle was raised to 80° C. after which 0.2 g. of Lupersol 11 was added every hour until only a trace of unconverted monomer remained. Poly(4-vinylpyridine) of molecular weight about 200,000 was recovered as a wet cake of substantially pure poly(4-vinylpyridine). The polymer was dried overnight in an oven and 30 grams of the dried polymer dispersed in 100 g. of water and then a solution of 60 g. of monosodium 2-chloroethyl-2-chloro-2-methyl malonate and 50 g. of water were charged. The reaction mixture was held at 85° C. for 6 hours under constant agitation and then recovered as the quaternized product of the process having repeating units of

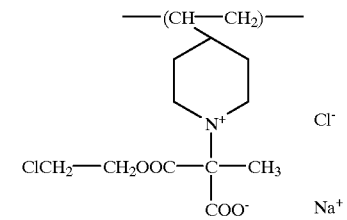

It is to be understood that the above examples are merely illustrative of preferred embodiments and that many modifications and substitutions indicated in the foregoing description can be made therein to provide the superior dye inhibiting, water soluble, complexing properties of the present ploymers as described herein without departing from the scope and intent of this invention.

What is claimed is:

1. A quaternized, water soluble vinyl pyridine carboxylate polymer containing (a) 30 to 100 wt. % quaternized units having the structure

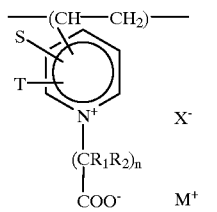

(b) 0 to 30 wt. % of a non-quaternized unit having the structure

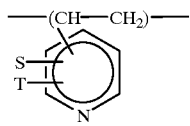

and (c) 0 to 70 wt. % of a free radical polymerizable comonomer wherein X is an anion; M is a cation; at least one of $R_1$ and $R_2$ in the expression $(CR_1R_2)_n$ is a carbonoxy containing radical selected from the group consisting of alkoxy, carboxyl, an alkali or alkaline earth metal salt of a carbxylic acid and a $C_2$ to $C_9$ carboxylate optionally substituted with halogen and any remaining non-carbonoxy containing $R_1$ and $R_2$ in the expression $(CR_1\ R_2)$ n is selected from the group consisting of hydrogen, lower alkyl and aryl, S and T are each independently hydrogen or $C_1$ to $C_4$ alkyl; and n has a value of 1 to 5.

2. The polymer of claim 1 wherein said comonomer is selected from the group consisting of styrene, lower alkyl styrene, lower alkyl acrylate, lower alkyl methacrylate, N-vinylpyrrolidone, N-vinyl caprolactam, acrylamide, methacrylamide, vinyl amide, vinyl imidazole and mixtures thereof.

3. The polymer of claim 1 wherein n has a value of 1–3.

4. The polymer of claim 1 wherein M is an alkali metal.

5. The polymer of claim 4 wherein M is sodium or potassium.

6. The polymer of claim 1 wherein X is halogen.

7. The poymer of claim 6 wherein X is chlorine or bromine.

8. The polymer of claim 1 which is a copolymer and contains about 70–95 wt. % (a), 0–0.5 wt. % (b) and 5–30 wt. % (c).

9. The polymer of claim 8 wherein S and T are hydrogen.

10. The polymer of one of claims 1 or 8 which has a weight average molecular weight of between about 5,000 and about 1,000,000.

11. The polymer of one of claims 1 or 8 having a weight average molecular weight of between about 20,000 and about 500,000.

12. The polymer of claim 1 wherein at least one of said $R_1$ and $R_2$ is $C_1$ to $C_4$ alkoxy.

13. The polymer of claim 1 wherein at least one of said $R_1$ and $R_2$ is —COOY wherein Y is hydrogen, an alkali or alkaline earth metal or a $C_1$ to $C_8$ alkyl optionally substituted with chloro, fluoro or bromo.

14. The process for the preparation of a stable, quaternized vinylpyridine carboxylate polymer of claim 1 which comprises:

(a) mixing a vinyl pyridine monomer, and optionally a free radical polymerizable comonomer with water in the presence of between about 10 and about 40 wt. % of a water soluble suspension agent at below polymerization temperature;

(b) gradually heating the mixture of (a) to polymerization temperature while introducing a polymerization initiating amount of a free radical polymerization initiator;

(c) polymerizing monomer while adding portions of initiator throughout the polymerization until the unreacted monomer concentration is below 1 wt. %;

(d) recovering the resulting vinyl pyridine polymer and mixing said polymer with water to provide a mixture containing between about 20 and about 50% solids;

(e) adding a quaternizing agent selected from the group consisting of a halogenated mono- or poly-alkali or alkaline earth metal salt of a saturated or unsaturated, —C—O— modified carboxylic acid;

(f) and quaternizing said vinylpridine polymer at a temperature between about 40° and about 140° C. until the desired degree of quaternization occurs and (g) recovering the resulting quaternized polymer as the product of the process.

15. The process of claim 14 wherein said comonomer is selected from the group consisting of styrene, lower alkyl styrene, lower alkyl acrylate, lower aklyl methacrylate, N-vinylpyrrolidone, N-vinyl caprolactam, vinyl amide, acrylamide, methacrylamide, vinyl imidazole and a mixture thereof.

16. The process of one of claims 14 or 15 wherein said monomer in the initial mixture introduced into the polymerization zone contains 70–100 wt. % N-vinyl pyridine and 0–70 wt. % of comonomer.

17. The process of one of claims 14 or 15 wherein S and T are hydrogen.

18. The process of one of claims 14 or 15 wherein said quaternizing agent is selected from the group consisting of a mon- or di-sodium or potassium salt of chlorinated or brominated, —C—O— modified, $C_2$ to $C_8$ saturated or unsaturated carboxylic acid and mixtures thereof.

19. An aqueous composition containing an effective chemically active, complexable amount of a component selected from the group of an active detergent, an active pharmaceutical, an active personal care component and an active agrochemical and between about 2 and about 1,000 ppm of the quaternized vinyl pyridine carboxylate polymer of claim 1.

20. The composition of claim 19 wherein said chemically active component is an active agrochemical employed in an amount effective to control plant growth, or viral, fungicidal or bacterial attack on a plant.

21. The composition of claim 19 wherein said active component is a laundry detergent or rinsing composition.

* * * * *